(12) United States Patent
Tanaka

(10) Patent No.: US 10,504,104 B2
(45) Date of Patent: Dec. 10, 2019

(54) MULTIFUNCTION CARD INCLUDING BIOMETRIC DATA, CARD PAYMENT TERMINAL, AND CARD PAYMENT SYSTEM

(71) Applicant: Brainy Inc., Naha-shi, Okinawa (JP)

(72) Inventor: Masashi Tanaka, Naha (JP)

(73) Assignee: Brainy Inc., Naha-shi (JP)

( * ) Notice: Subject to any disclaimer, the term of this patent is extended or adjusted under 35 U.S.C. 154(b) by 0 days.

(21) Appl. No.: 15/910,985

(22) Filed: Mar. 2, 2018

(65) Prior Publication Data

US 2018/0189773 A1 Jul. 5, 2018

Related U.S. Application Data

(63) Continuation of application No. PCT/JP2015/075063, filed on Sep. 3, 2015.

(51) Int. Cl.
| | |
|---|---|
| *G06Q 20/34* | (2012.01) |
| *G06Q 20/32* | (2012.01) |
| *G06Q 20/40* | (2012.01) |
| *G06Q 20/20* | (2012.01) |
| *G07F 7/08* | (2006.01) |

(52) U.S. Cl.
CPC ........... *G06Q 20/341* (2013.01); *G06Q 20/20* (2013.01); *G06Q 20/204* (2013.01); *G06Q 20/322* (2013.01); *G06Q 20/352* (2013.01); *G06Q 20/3552* (2013.01); *G06Q 20/3563* (2013.01); *G06Q 20/3574* (2013.01); *G06Q 20/409* (2013.01); *G06Q 20/40145* (2013.01); *G07F 7/08* (2013.01); *G07F 7/0813* (2013.01)

(58) Field of Classification Search
None
See application file for complete search history.

(56) References Cited

U.S. PATENT DOCUMENTS

| | | | | |
|---|---|---|---|---|
| 8,050,992 | B2 * | 11/2011 | Wu | ........... G06Q 20/105 235/380 |
| 8,461,961 | B2 * | 6/2013 | Wu | ........... G06K 19/06187 340/5.41 |

(Continued)

FOREIGN PATENT DOCUMENTS

| | | | | |
|---|---|---|---|---|
| EP | 1715461 A2 * | 10/2006 | ............ | G06F 21/32 |
| JP | 2003141455 A | 5/2003 | | |

(Continued)

OTHER PUBLICATIONS

ISA Japan Patent Office, International Search Report Issued in Application No. PCT/JP2015/075063, dated Dec. 15, 2015, WIPO, 5 pages.

*Primary Examiner* — Christle I Marshall
(74) *Attorney, Agent, or Firm* — McCoy Russell LLP

(57) ABSTRACT

A multifunction card includes an integrated circuit. The integrated circuit includes a memory, a processor, and a communicator. The memory stores first software which is executed by the processor and realizes a card payment function, second software which is executed by the processor and realizes a function other than the card payment function, biometric data for a user capable of using the card payment function, and setting data which represents that biometric authentication for the first software is necessary and whether biometric authentication for the second software is necessary.

11 Claims, 13 Drawing Sheets

(56) References Cited

U.S. PATENT DOCUMENTS

| | | | | |
|---|---|---|---|---|
| 2004/0188519 A1* | 9/2004 | Cassone | ............... | G06Q 10/02 235/382 |
| 2006/0138245 A1* | 6/2006 | Lee | ............... | G11C 11/005 235/492 |
| 2010/0161488 A1* | 6/2010 | Evans | ............... | G06Q 20/20 705/44 |
| 2013/0332365 A1* | 12/2013 | Evans | ............... | G06Q 20/20 705/44 |
| 2015/0015365 A1* | 1/2015 | Ortiz | ............... | H04L 63/0861 340/5.53 |

FOREIGN PATENT DOCUMENTS

| | | |
|---|---|---|
| JP | 2006195599 A | 7/2006 |
| JP | 2008176435 A | 7/2008 |
| JP | 2009064117 A | 3/2009 |
| JP | 2009157592 A | 7/2009 |
| JP | 2010140467 A | 6/2010 |
| JP | 2012178023 A | 9/2012 |
| JP | 5713516 B1 | 5/2015 |

\* cited by examiner

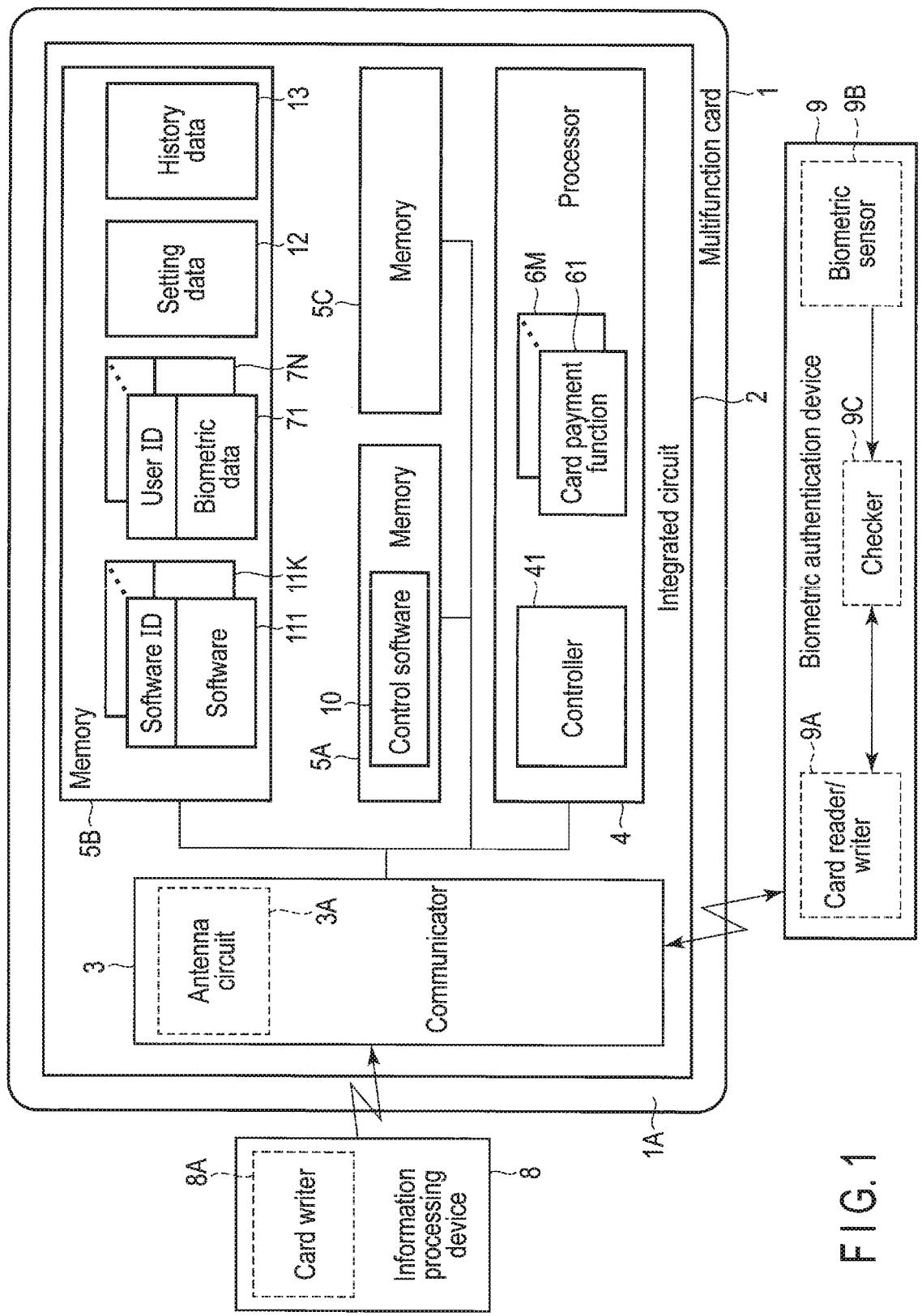
F I G. 1

| Software ID | User ID |
|---|---|
| Credit card | U1 |
| Point card | |
| Car key | U1,U2,U3 |
| ⋮ | ⋮ |

FIG. 3

| Time data | Software ID | Authentication result | Authenticated user ID |
|---|---|---|---|
| 2017/1/2 | Car key | ○ | U2 |
| 2017/1/10 | Credit card | ○ | U1 |
| 2017/1/12 | Point card | | |
| ⋮ | ⋮ | ⋮ | ⋮ |

FIG. 4

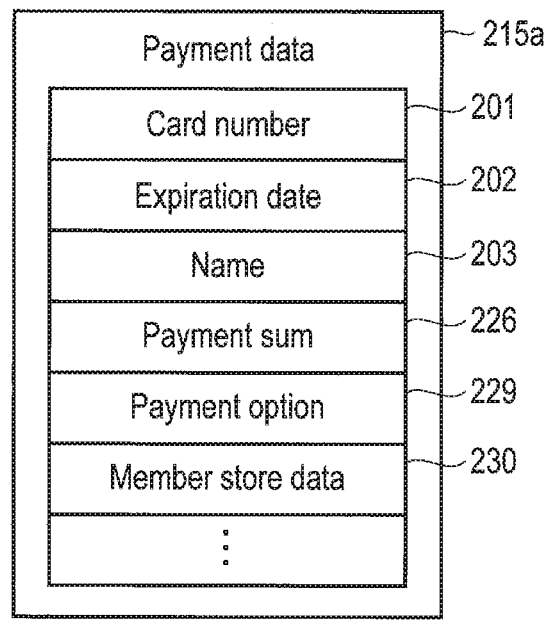
F I G. 8
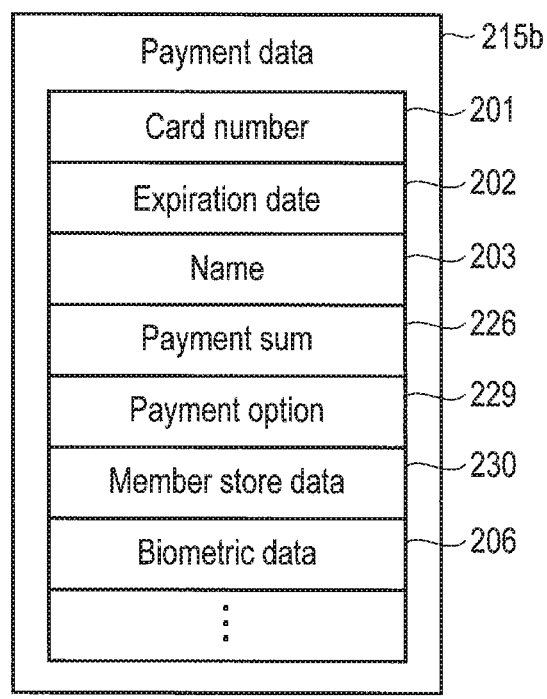
F I G. 9

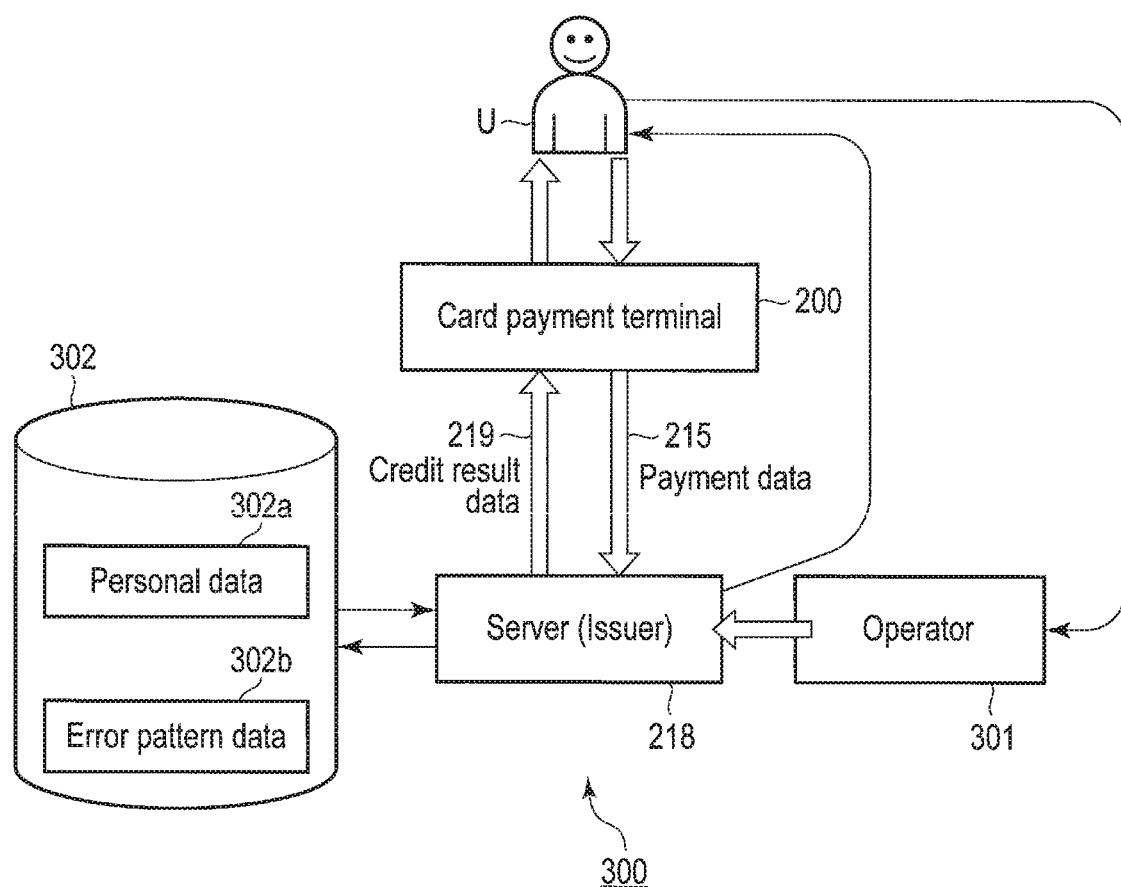
F I G. 14

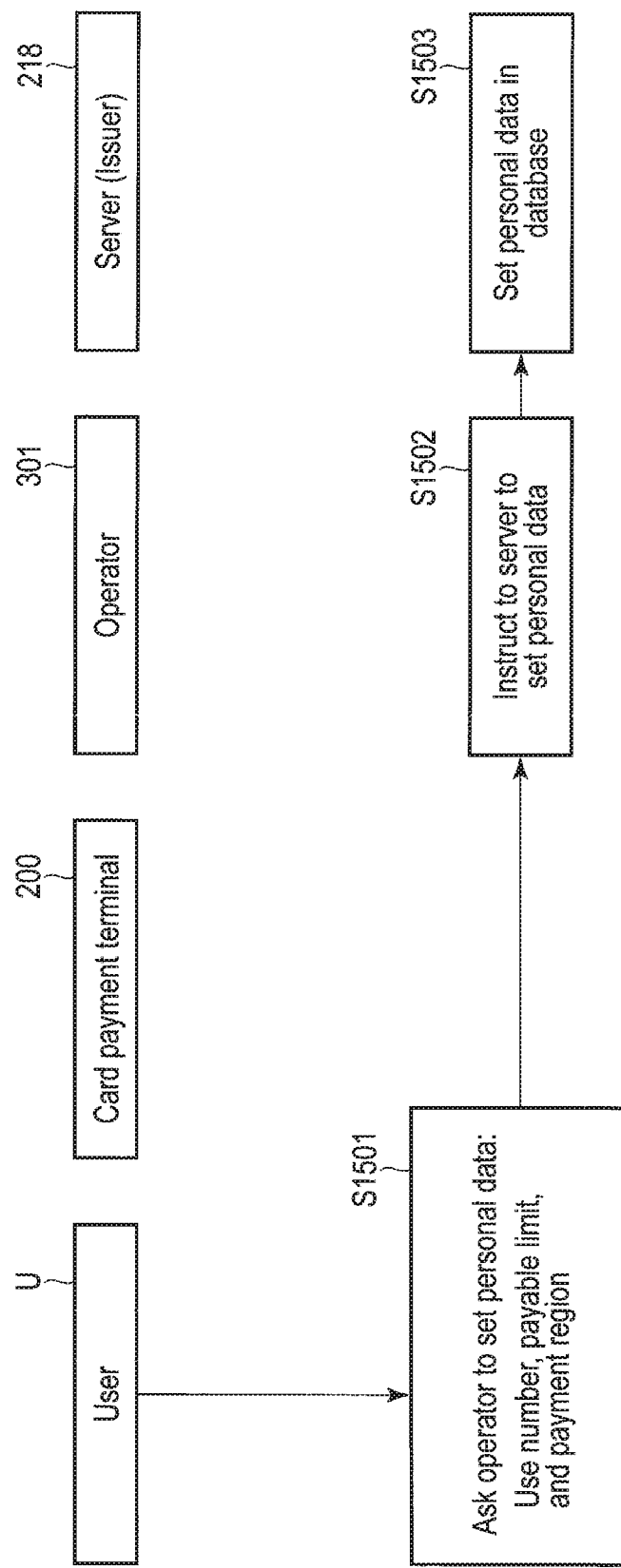
F I G. 15

MULTIFUNCTION CARD INCLUDING BIOMETRIC DATA, CARD PAYMENT TERMINAL, AND CARD PAYMENT SYSTEM

CROSS-REFERENCE TO RELATED APPLICATIONS

The present application is a continuation of International Patent Application No. PCT/JP2015/075063, filed on Sep. 3, 2015. The entire contents of the above-mentioned application are incorporated herein by reference.

TECHNICAL FIELD

1. Field of the Invention

The present invention relates to a multifunction card, card payment terminal, and card payment system.

2. Description of the Related Art

Credit card fraud cases because of, for example, a forged signature, PIN number analysis, skimming, card forgery, and unauthorized use by a relative increase.

In recent years, in order to prevent an invalid use of card payment, biometric authentication of high security is used in some cases.

As an example of a system which authenticates a user using the biometric authentication, an automated teller machine (ATM) is used for bank balance inquiry, money deposit/withdrawal, and transfer process. In such a banking system, the automated teller machine acquires biometric data of a user and transmits the data to a server of a bank. The server executes biometric authentication to compare biometric data of the user received from the automated teller machine and biometric data stored in a database.

Furthermore, a prior art of a credit card has a finger print sensor to compare finger data stored in the credit card and finger print data of the user acquired by the finger print sensor in the credit card.

Furthermore, Japanese Patent No. 5713516 discloses that a card payment terminal acquires biometric data stored in a credit card, acquires biometric data of the user by a sensor of the card payment terminal, and checks the acquired biometric data.

BACKGROUND AND SUMMARY

Technical Problem

However, using biometric data stored in a credit card in an other function than the card payment is not discussed in the above-mentioned techniques.

The present application is made in consideration of the above and provides a multifunction card, card payment terminal, and card payment system which can use the biometric data in the other function than the card payment.

According to an embodiment, a multifunction card includes an integrated circuit. The integrated circuit includes a memory, processor, and communicator. The memory stores first software executed by the processor to realize a card payment function, second software executed by the processor to realize an other function than the card payment function, biometric data for a user capable of using the card payment function, and setting data indicative of a necessity of the biometric authentication with respect to the first software and indicative of whether or not the biometric authentication is necessary with respect to the second software. The processor receives a command from an external device via the communicator. If the command corresponds to the first software, the processor determines that the biometric authentication is necessary with respect to the first software based on the setting data, reads the biometric data from the memory, transmits the biometric data to the external device via the communicator, receives a first biometric authentication result with respect to the biometric data from the external device via the communicator, and transmits first data of card payment corresponding to the first software to the external device via the communicator if the first biometric authentication result indicates success. If the command corresponds to the second software, the processor determines whether or not the biometric authentication is necessary with respect to the second software based on the setting data, transmits second data with respect to the second software to the external device via the communicator if the biometric authentication is unnecessary, reads the biometric data from the memory and transmits the biometric data to the external device via the communicator if the biometric authentication is necessary, receives a second biometric authentication result with respect to the biometric data from the external device via the communicator, and transmits the second data with respect to the second software to the external device via the communicator if the second biometric authentication result indicates success.

Effect of Invention

According to an embodiment, biometric data can be used in other functions than the card payment.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing an example of structure of a multifunction card of a first embodiment.

FIG. 3 shows data structure of an example of setting data of the first embodiment.

FIG. 4 shows data structure of an example of history data of the first embodiment.

FIG. 8 shows data structure of a first example of payment data of the second embodiment.

FIG. 9 shows data structure of a second example of the payment data of the second embodiment.

FIG. 14 is a block diagram of an example of a card payment system of a third embodiment.

FIG. 15 is a flowchart of an example of a personal data setting process of the third embodiment.

DETAILED DESCRIPTION OF THE DRAWINGS

Figure 2:
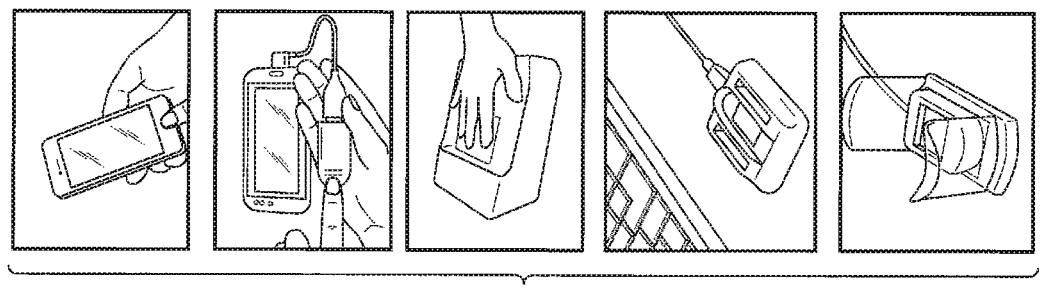
FIG. 2 is a block diagram showing a plurality of functions of the multifunction card of the first embodiment.
Figure 2:
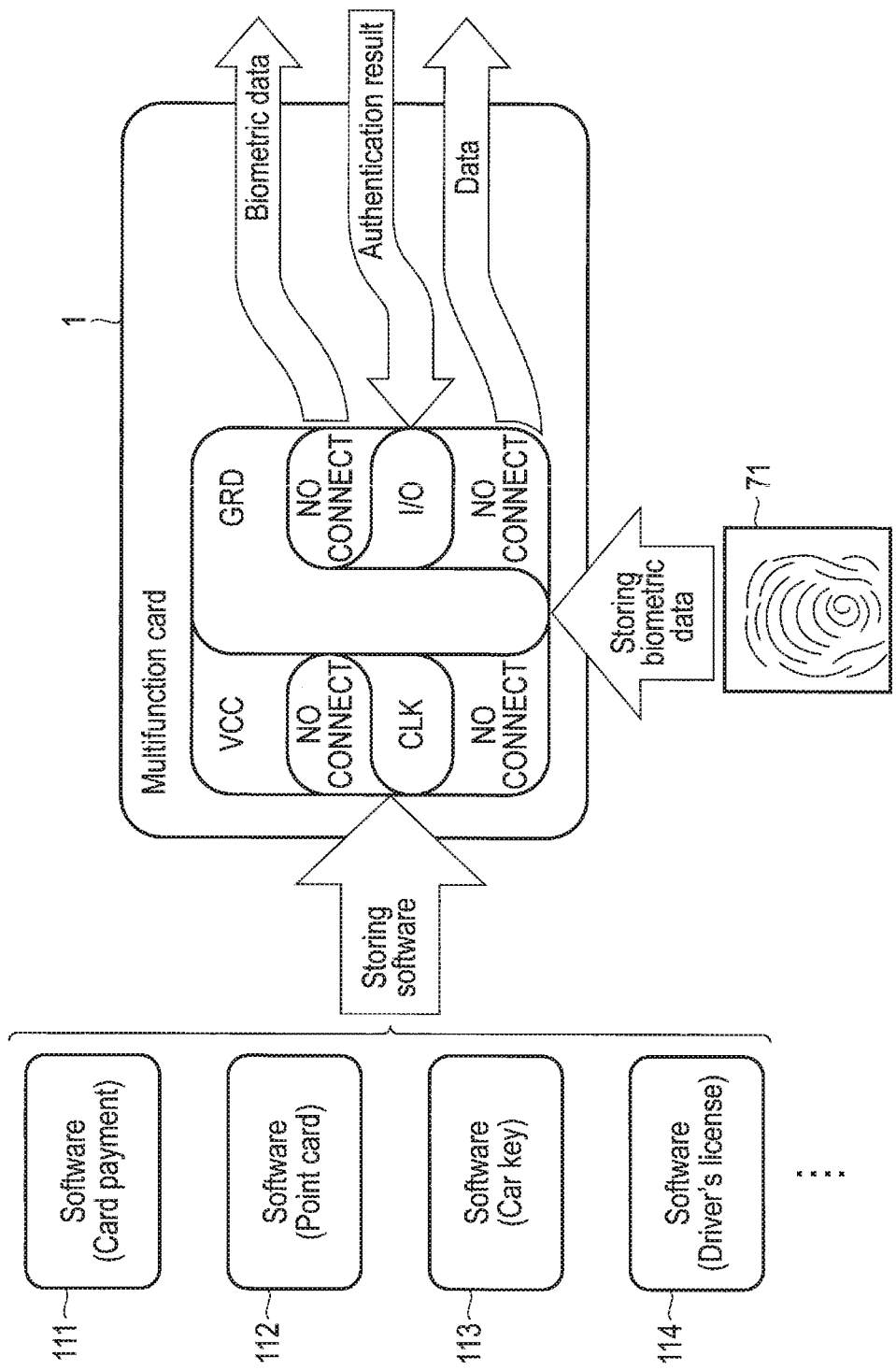

Hereinafter, embodiments of the present application will be described with reference to accompanying drawings. Note that, in the following description, similar or substantially same functions and structural elements are referred to by the same reference numbers and explanation considered redundant will be omitted.

First Embodiment

In the present embodiment, a multifunction card including a card payment function and other functions will be described. The multifunction card stores biometric data.

In the present embodiment, identification data will be referred to as ID.

FIG. 1 is a block diagram showing an example of structure of the multifunction card of the present embodiment.

The multifunction card 1 includes, for example, a card body 1A of card shape and an integrated circuit 2 in the card body 1A. The integrated circuit 2 may be an integrated circuit (IC) chip. The integrated circuit 2 includes a communicator 3, processor 4, and memories 5A to 5C.

The multifunction card 1 operates in cooperation with an information processing device 8 or a biometric authentication device 9.

The information processing device 8 transmits, for example, signals, commands, software, program, data, setting data, user ID, software ID, data ID, and other various data using a card writer 8A.

The biometric authentication device 9 includes a card reader/writer 9A, biometric sensor 9B, and checker 9C. The card reader/writer 9A receives signals, commands, data, and information from the multifunction card 1, and transmits signals, commands, data, and information to the multifunction card 1. The biometric sensor 9B acquires biometric data of a user of the multifunction card 1. The checker 9C compares biometric data acquired by the biometric sensor 9B and the biometric data received from the multifunction card 1 via the card reader/writer 9A and executes biometric authentication. Then, the checker 9C transmits a result of the biometric authentication to the multifunction card 1 via the card reader/writer 9A.

The biometric authentication device 9 may be a card payment terminal in a shop, or may be an information processing device of some kind. The information processing device may be a personal computer, mobile device such as smart phone, or tablet computer.

The multifunction card 1 may include at least one of card payment functions 61 including a credit card function, debit card function, and prepaid card function. In the present embodiment, the card payment function 61 is set to a credit card function for the simpler explanation.

In the present embodiment, the multifunction card 1 includes a plurality of biometric data 71 to 7N corresponding to a plurality of users. If the biometric data 71 to 7N are included in the multifunction card 1, the multifunction card 1 can be shared by the users of an optional group such as a family or a company. However, in the present embodiment, only a single person is set as a user who uses the multifunction card 1 as a credit card. Note that a plurality of users may use the multifunction card 1 as a credit card.

If the multifunction card 1 is specifically used by a single user, the biometric data included in the multifunction card 1 may correspond to this single user. Other functions 62 to 6M than the card payment function 61 included in the multifunction card 1 may be a point card function, ticket of a vehicle such as bus or train, social security number, resident number, stamp card, key card, driver's license, health care card, passport, car key, My number card, and medical card. In the present embodiment, for example, the card payment function 61 of the multifunction card 1 can be used if the biometric authentication as to a certain one user is succeeded. A second function such as a point card function of the multifunction card 1 can be used without performing the biometric authentication. A third function such as a car key function or a key card function of the multifunction card 1 can be used if the biometric authentication as to any one of a plurality of biometric data stored in the multifunction card 1 is succeeded.

The multifunction card 1 receives a radio wave (electromagnetic field) sent from a device such as card writer 8A or card reader/writer 9A using an antenna circuit 3A of the communicator 3 and converts the received radio wave into electricity to be used as power for the integrated circuit 2. However, the multifunction card 1 may include a power source.

The communicator 3 receives, in a contact or non-contact manner or through a wire or wirelessly, signals, commands, software, program, data, setting data, user ID, software ID, data ID, and other various data from the card writer 8A of the information processing device 8 in the setting of the multifunction card 1.

The communicator 3 transmits/receives, in a contact or non-contact manner or through a wire or wirelessly, signals, commands, data, and information.

The processor 4 controls the communicator 3 and accesses to the memories 5A to 5C. Specifically, the processor 4 executes control software 10 stored in the memory 5A. Furthermore, the processor 4 can execute software 111 to 11K for various functions stored in the memory 5B. The processor 4 can use the memory 5C as a working memory. The processor 4 executes the control software 10 stored in the memory 5A, and under control of the control software 10, can execute software 111 to 11K stored in the memory 5B. Furthermore, if new software is added to the memory 5B, the processor 4 can execute the new software. For example, the control software 10 may be an operating system (OS). For example, software 111 to 11K may be applications.

For example, the memories 5A and 5B are nonvolatile memories. Specifically, the memory 5A may be a read only memory (ROM), and the memory 5B may be an erasable programmable read-only memory (EPROM) or an electrically erasable programmable read-only memory (EEPROM).

The memory 5B stores software 11l to 11K associated with the software ID, biometric data 71 to 7N associated with the user ID, setting data 12, and history data 13.

The software 11l to 11K each include programs for various functions and data related to the programs. With executable software 11l to 11K, the multifunction card 1 can perform other functions 62 to 6M in addition to the card payment function 61. For example, the software 11l performs the card payment function 61 as a credit card, and the software 112 to 11K perform other functions 62 to 6M than the card payment function 61.

The biometric data 71 to 7N may be finger print data, vein data, artery data, palm shape data, retina data, iris data, face data, blood vessel data, voice data, voice print data, and ear shape data.

The setting data 12 include various data required for operation of the control software 10 and software 11l to 11K of the multifunction card 1. For example, the setting data 12 associate the software ID indicative of the software 11l to 11K stored in the memory 5B of the multifunction card 1 with the user ID indicative of users of biometric authentication candidates (targets) for management. Thus, for example, the multifunction card 1 allows the card payment function 61 to a certain user, allows, for example, a point card function to anyone (biometric authentication unnecessary), and allows, for example, a car key function to a plurality of users. Thus, security levels can be set corresponding to the functions of the multifunction card 1.

Note that, if sharing of the multifunction card 1 is not intended, and the multifunction card 1 is intended to be used by a specific single person, the setting data 12 may be managed by associating the software ID with data indicative of whether or not the biometric authentication is necessary.

The history data 13 associate, at each time when the multifunction card 1 is used, time data, software ID indicative of target software, data indicative of whether or not the biometric authentication succeeds, user ID indicative of an authenticated user when the biometric authentication succeeds together for management.

Note that, if sharing of the multifunction card 1 is not intended, and the multifunction card 1 is intended to be used by a specific single person, user ID may be omitted from the data included in the history data 13.

Each of the software 11l to 11K is executed under control of the control software 10.

The software 11l is, for example, executed by the processor 4 to perform the card payment function 61 in a card side.

The software 112 is, for example, executed by the processor 4 to perform the point card function 62 in the card side.

The software 113 is, for example, executed by the processor 4 to perform the car key function 63 in the card side.

The controller 41 is realized when the processor 4 executes the control software 10.

The controller 41 receives, when the multifunction card 1 is set, software 11l to 11K, software ID, user ID indicative of users of the biometric authentication candidates (targets), biometric data 71 to 7N, and user ID indicative of users corresponding to the biometric data 71 to 7N from the card writer 8A via the communicator 3. Then, the controller 41 associates the received software with the software ID and stores them in the memory 5B. The controller 41 associates the received software ID with the user ID indicative of users of the biometric authentication candidates and updates the setting data 12. The controller 41 associates the received biometric data 71 to 7N with the corresponding user ID and stores them in the memory 5B.

The control software 10 may be included in the OS, for example. Specifically, the software 10 may be included in a multi-application OS or in a versatile OS; a virtual machine. However, the control software 10 may be software operating under control of the OS instead of being incorporated in the OS.

The controller 41 determines (selects) software which is executed from the software 11l to 11K based on a command received via the communicator 3.

The controller 41 determines whether or not the biometric authentication is necessary for the determined software based on the setting data 12.

The controller 41 executes the determined software if the biometric authentication is not necessary for the determined software.

If the biometric authentication is necessary for the determined software, the controller 41 transmits biometric data to the biometric authentication device 9 via the communicator 3 until an authentication result indicative of authentication success is received or until the biometric authentication with respect to all biometric data set as the biometric authentication candidates with respect to the determined software is finished. Then, the controller 41 receives an authentication result from the card reader/writer 9A of the biometric authentication device 9 via the communicator 3.

If the received authentication result indicates authentication success, the controller 41 executes the determined software, associates time data, software ID indicative of the determined software, authentication result indicative of success of the biometric authentication, and user ID indicative of the user whose biometric authentication is succeeded together, and updates the history data 13 in the memory 5B.

If the biometric authentication with respect to all biometric data set as the biometric authentication candidates with respect to the determined software is finished in the setting data 12, and the received authentication result with respect to all biometric data of the biometric authentication indicates a failure, the controller 41 associates the time data, the software ID indicative of the determined software, and authentication result indicative of biometric authentication failure together and updates the history data 13 in the memory 5B.

If the biometric authentication with respect to all biometric data set as the biometric authentication candidates with respect to the determined software is finished in the setting data 12, and the received authentication result with respect to all biometric data of the biometric authentication indicates a failure, the controller 41 bans reading of various data in the memory 5B of the multifunction card 1 to protect the multifunction card 1.

The controller 41 may change, based on the setting data 12, a usable state of the multifunction card 1 to an unusable state in a use based on the software determined to be biometric authentication failure. Or, the controller 41 may change, based on the setting data 12, a usable state of all functions of the multifunction card 1 to an unusable state if there is one or more software determined to be biometric authentication failure.

FIG. 2 is a block diagram showing a plurality of functions of the multifunction card 1 of the present embodiment.

As described above, the multifunction card 1 stores software 11l to 11K to perform the card payment function 61, point card function 62, car key function 63, and driver's license function 64, for example. The software 11l to 11K include data necessary for corresponding functions.

Furthermore, the multifunction card 1 stores the biometric data 71. The biometric data 71 may be shared with several functions.

For example, the biometric authentication device 9 such as a card payment terminal including the biometric sensor 9B receives the biometric data 71 from the multifunction card 1, compares the biometric data 71 with biometric data acquired by the biometric sensor 9B, and transmits an authentication result to the multifunction card 1.

The multifunction card 1 transmits, if the biometric authentication succeeds, data corresponding to a desired function to the biometric authentication device 9.

FIG. 3 shows data structure of an example of the setting data 12 of the present embodiment.

The setting data 12 associate the software ID indicative of software installed in the multifunction card 1 with user ID indicative of a user who can use the software if the biometric authentication succeeds. For example, if the user ID is not associated with the software ID in the setting data 12, the software indicated by the software ID can be used by anyone and the biometric authentication is unnecessary.

FIG. 4 shows data structure of an example of the history data 13 of the present embodiment.

The history data 13 associate time data of the time when a command is received, software ID indicative of software corresponding to the command, biometric authentication result, and user ID indicative of an authenticated user when the biometric authentication succeeds.

Figure 5:
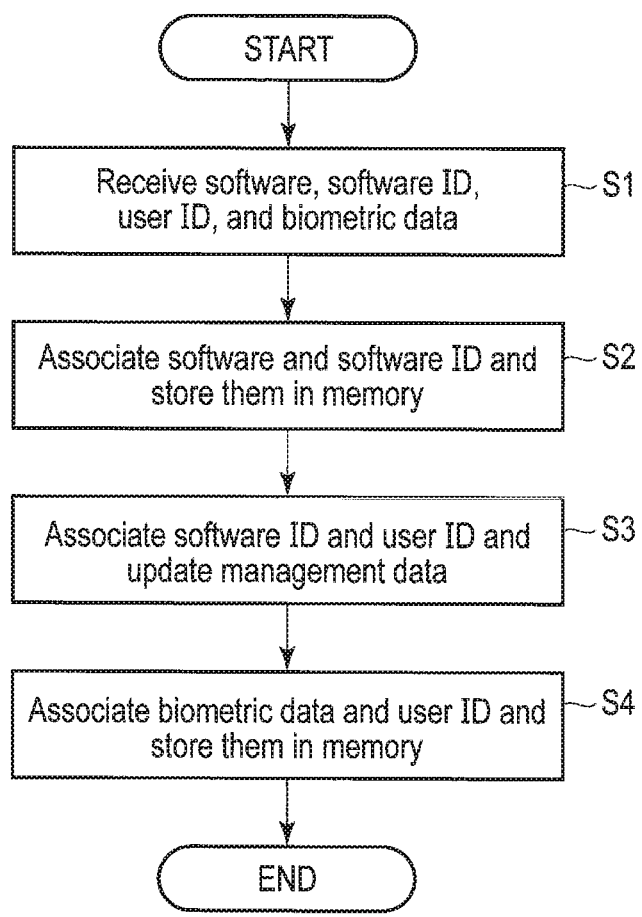
FIG. 5 is a flowchart of an example of a setting process of the multifunction card of the first embodiment.

FIG. 5 is a flowchart of an example of a setting process of the multifunction card 1 of the present embodiment.

In step S1, the communicator 3 receives software, software ID, user ID indicative of a user of biometric authentication candidate, and biometric data of the user of biometric authentication candidate from the car reader 8A of the information processing device 8. Software, information, and data received in step S1 may be received in some separated occasions.

In step S2, the controller 41 associates the received software with software ID and stores them in the memory 5B.

In step S3, the controller 41 associates the received software ID with user ID indicative of a user of biometric authentication candidate and stores them in the setting data 12.

In step S4, the controller 41 associates the received biometric data with user ID and stores them in the memory 5B.

Note that the order of above-mentioned steps S2 to S4 may be arbitrarily switched or may be executed at the same time.

Figure 6:
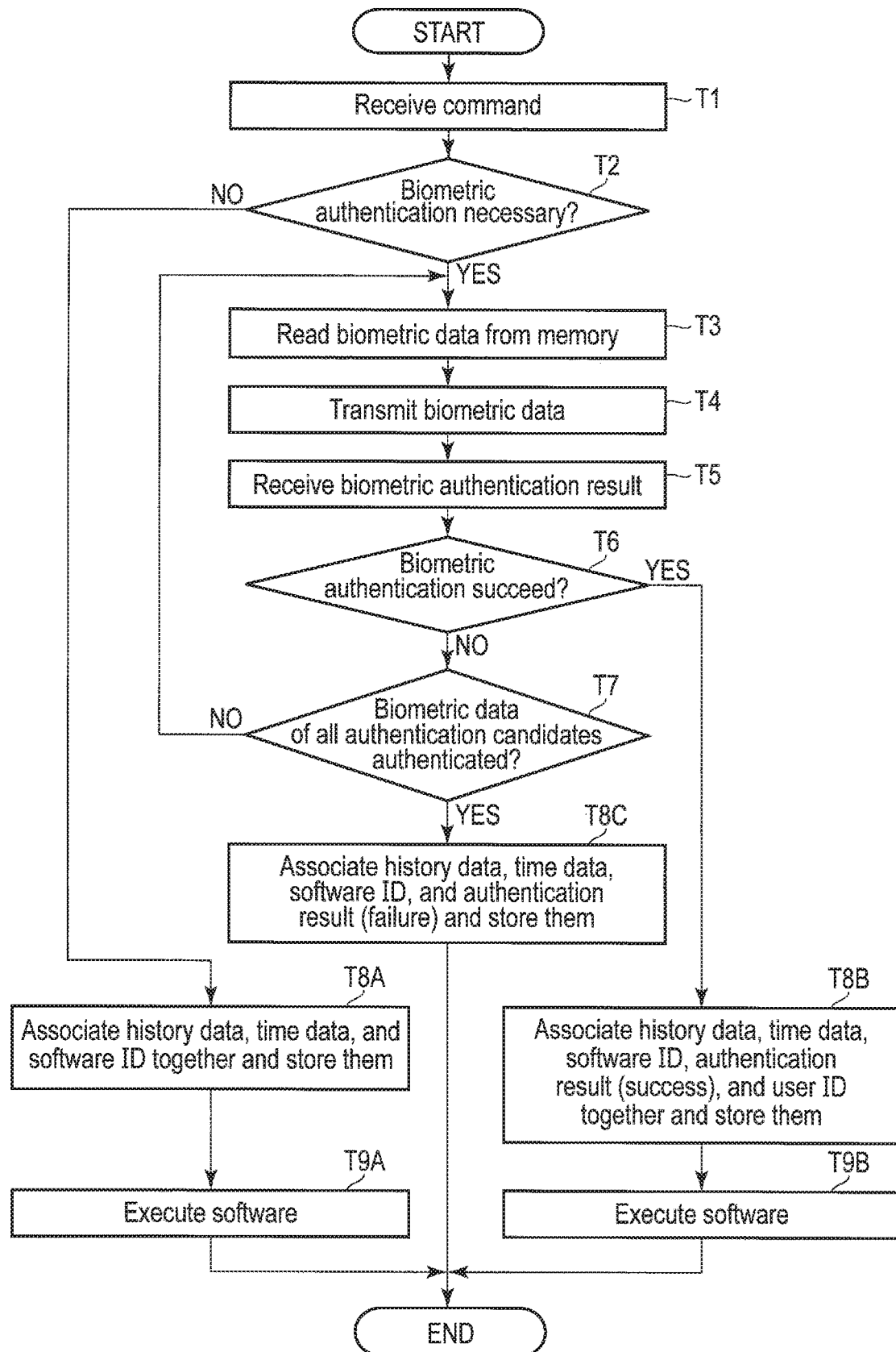
FIG. 6 is a flowchart of an example of a using process of the multifunction card of the first embodiment.

FIG. 6 is a flowchart of an example of a use process of the multifunction card 1 of the present embodiment.

In step T1, the communicator 3 receives a command from the card reader/writer 9A of the biometric authentication device 9.

In step T2, the controller 41 determines whether or not the biometric authentication is necessary. Specifically, the controller 41 determines whether or not software ID indicated by the command is associated with user ID in the setting data 41.

If the biometric authentication is unnecessary, the process moves to step TBA.

If the biometric authentication is necessary, the controller 41 reads biometric data of biometric authentication candidate from the memory 5B in step T3. Specifically, the controller 41 selects user ID associated with the software ID indicated by the command in the setting data 12, and reads the biometric data associated with the selected user ID from the memory 5B.

In step T4, the communicator 3 transits the read biometric data to the biometric authentication device 9.

In step T5, the communicator 3 receives a biometric authentication result from the biometric authentication device 9.

In step T6, the controller 41 determines whether the biometric authentication result is a success or a failure.

If the biometric authentication result is a success, the process moves to step T8B.

If the biometric authentication result is a failure, in step T7, the controller 41 determines whether or not the biometric authentication is performed with respect to the biometric data of all biometric authentication candidates. Specifically, the controller 41 refers, in the setting data 12, user ID associated with software ID indicated by the command as user ID of biometric authentication candidate, refers to biometric data associated with user ID of biometric authentication candidate as biometric data of biometric authentication candidate, and determines whether or not the biometric authentication is performed with respect to the biometric data of all biometric authentication candidates.

If the biometric authentication is performed with respect to the biometric data of all biometric authentication candidates and the biometric authentication result is not a success, the process moves to step T8C.

If the biometric authentication is not performed with respect to the biometric data of all biometric authentication candidates, the process moves to step T3, and the similar process is performed with respect to biometric data of next biometric authentication candidate.

If the biometric authentication is unnecessary in step T2, the controller 41 associates time data with software ID indicated by command and stores them in the history data 13 in step TBA.

Then, in step T9A, the controller 41 executes software associated with software ID indicated by the command and transmits data used in an external device via the communicator 3. Thus, the multifunction card 1 can be used for functions which do not require the biometric authentication.

If the biometric authentication is a success in step T6, the controller 41 associates time data, software ID, authentication result indicative of biometric authentication success, and authenticated user ID together, and stores them in the history data 13.

Then, in step T9B, the controller 41 executes, as in step T9A, software associated with software ID indicated by the command, and transmits data used in an external device via the communicator 3. For example, if the command is a payment command, the controller 41 executes the card payment function 61 and transmits user ID indicative of user whose biometric authentication is succeeded, and data for payment including card number, expiration date, name, address, phone number, and the like corresponding to the user ID to the card reader/writer 9A of the card payment terminal.

If the biometric authentication is performed with respect to the biometric data of all biometric authentication candidates and the biometric authentication result is the failure in step T7, the controller 41 associates time data, software ID, and authentication result indicative of biometric authentication failure together and stores them in the history data 13 in step T8C. Then, after step T8C, the process ends.

As described above, in the present embodiment, the multifunction card 1 including biometric data 71 to 7N can be used in various purposes, functions, uses, and services. The biometric data 71 to 7N can be used for the biometric authentication of other functions than the card payment function 61.

In the present embodiment, whether or not the biometric authentication is performed can be determined depending on the purposes, functions, uses, and services of the multifunction card 1.

In the present embodiment, with the setting data 12, when the biometric authentication is succeeded with respect to at least one certain user, various services such as transmitting data from the multifunction card 1 to the biometric authentication device 9 can be provided.

In the present embodiment, the use history of multifunction card 1 can be managed based on the history data 13 and unauthorized use can be prevented.

In the present embodiment, a plurality of card functions can be concentrated into one multifunction card 1. Thus, a user is not heavily bothered by management of cards, convenience of user can be increased, and unauthorized use of card can be prevented.

In the present embodiment, for example, if the multifunction card 1 is used for the card payment, only a single user can use the card 1, and if the multifunction card 1 is used as a car key, several users can share the card 1.

In the present embodiment, for example, with the biometric data used as a substitute for passwords, the user is not bothered by management of passwords and changing passwords.

In the present embodiment, if the biometric authentication is failed, a function biometric authentication of which is determined to be a failure or all functions of the multifunction card 1 can be set unusable state to increase the security of the multifunction card 1.

Second Embodiment

Hereinafter, a second embodiment of a card payment terminal will be described with reference to accompanying drawings.

In the present embodiment, a card storing biometric data used for biometric authentication is a credit card. However, as a card storing the biometric data may be any card which can be used for payment, that is, it may be a debit card, electronic money card, or the like. For example, the card storing biometric data used for biometric authentication may be the multifunction card 1 of the first embodiment.

Figure 7:
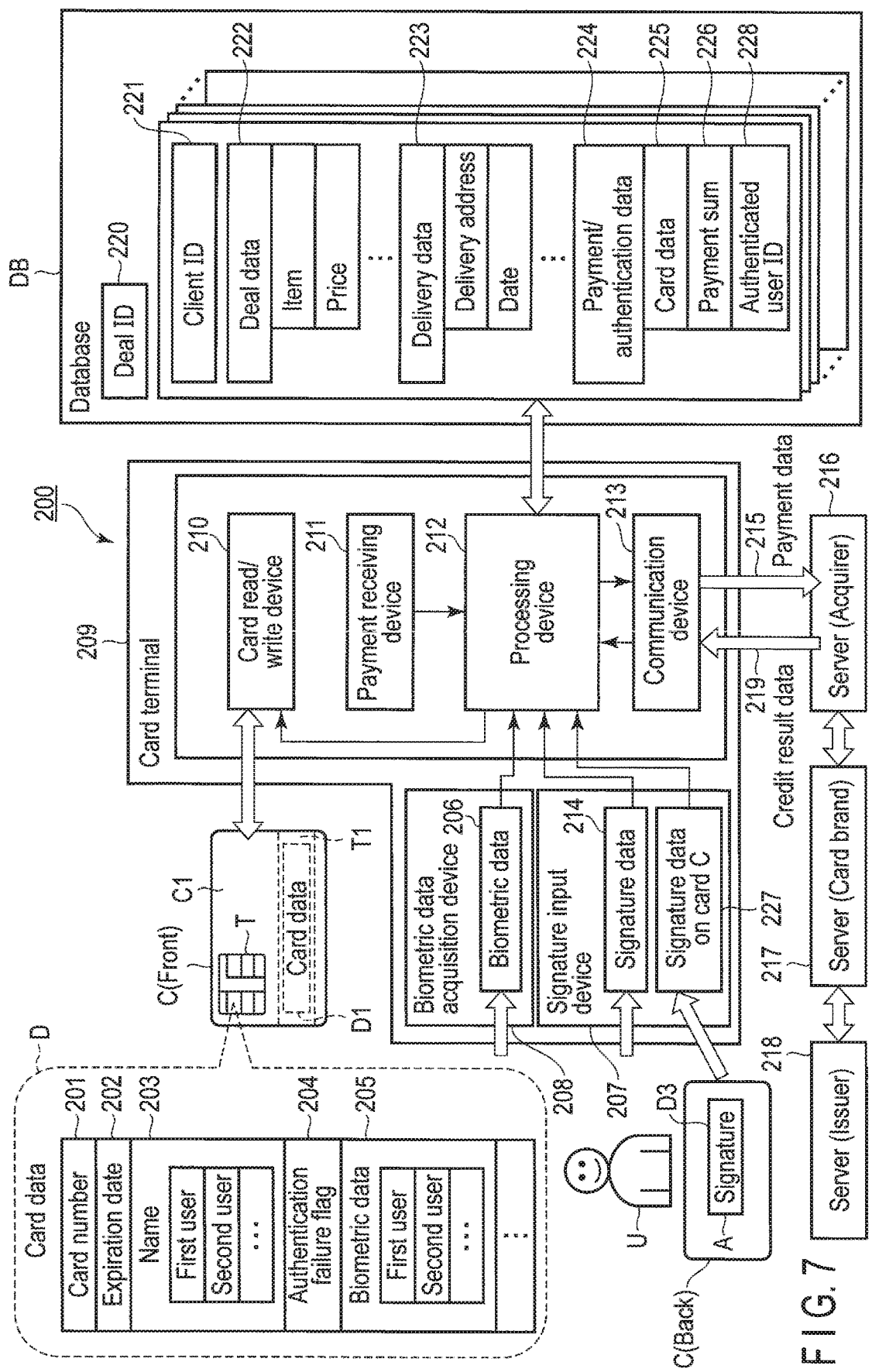
FIG. 7 is a block diagram of an example of structure of a card payment terminal and peripheral devices of a second embodiment.

FIG. 7 is a block diagram of an example of structure of the card payment terminal and peripheral devices of the present embodiment.

In the present embodiment, a card C of a user U includes a card body C1 of card-like shape and an integrated circuit T of the card body C1. The integrated circuit T stores, for example, card number 201 as an example of card ID, expiration date 202 name 203 as an example of user ID, authentication failure flag 204 as an example of biometric authentication result, and card data D including biometric data 205. The card data D are already stored in the card C when the card is issued, for example. As the biometric data 205, for example, finger print pattern, iris pattern, vein pattern, and the like can be used as in the above-mentioned biometric data 71 to 7N, and the biometric data 205 are compared to biometric data 206 of the user U acquired when the payment is performed in the biometric authentication. In order to allow sharing of a single card by a plurality of users, data of a plurality of users can be included in the biometric data 205 and name 203. Identification of users will be described later.

A card payment terminal 200 includes a signature input device 207, biometric data acquisition device 208 as an example of the biometric sensor 9B, and card terminal 209. The card terminal 209 includes a card data read/write device 210 as an example of the card reader/writer 9A, payment receiving device 211, processing device 212 as an example of the checker 9C, and communication device 213.

The card data read/write device 210 reads card data D stored in the card C of user U and transmits the card data D to the processing device 212. Furthermore, the card data read/write device 210 can rewrite the card data D stored in the card C as instructed by the processing device 212.

Furthermore, the card data read/write device 210 can read card data D1 stored in a magnetic storage medium T1 of the card C. For example, the card data D1 include at least one of used ID and card ID The payment receiving device 211 receives, for example, payment sum and payment option (for example, lump-sum payment or installment payment) based on an operation by a store clerk of a member store and transmits the payment sum and payment option to the processing device 212.

The signature input device 207 acquires signature data 214 of user U in the card payment time and transmits the signature data 214 to the processing device 212 of the card terminal 209. Note that the signature input device 207 is a device which can receive a handwritten signature of user U and sends the signature to the processing device 212 in an electronic data form. For example, the signature input device 207 may be a device which can receive an electronic signature made by a stylus, or a scanner or camera device which can digitize a signature made on a paper by user U.

Furthermore, the signature input device 207 can acquire a signature D3 of user U written in a signature area A on the back surface of card C as an electronic data (signature data 227 on card C). For example, the signature D3 may be read by a scanner or a camera of the signature input device 207 operated by the user U.

The signature input device 207 transmits the signature data 227 on card C to the processing device 212.

The biometric data acquisition device 208 acquires biometric data 206 of user U in the card payment time as electronic data and transmits the biometric data 206 to the processing device 212 of the card terminal 209.

Note that, in the present embodiment, the signature input device 207 and the biometric data acquisition device 208 are not necessarily separated, and may be realized as a single device. In that case, data sent to the processing device 212 may not be separated as biometric data and signature data.

The processing device 212 automatically determines whether or not the biometric data 206 of used U are read by the biometric data acquisition device 208 in the payment time and whether or not the signature data 214 of used U are read by the signature input device 207.

The processing device 212 creates payment data 215 and transmits the payment data 215 to the communication device 213. The payment data 215 will be described later with reference to FIGS. 8 to 10.

Note that the processing device 212 controls a series of card authentication process of the card terminal 209. Various authentication processes performed by the processing device 212 will be described later with reference to FIG. 12.

If the biometric data 206 are not acquired by the biometric data acquisition device 208, the processing device 212 may associate at least one of user ID and card ID read from the magnetic storage medium T1 of card C, signature data 214, and payment sum together and store them in a database DB.

The communication device 213 transmits the payment data 215 to an acquirer server 216 via a network. Then, the payment data 215 are transmitted to card brand server 217 from the acquirer server 216, for example, and transmitted to an issuer server 218 from the card brand server 217. For example, the communication device 213 transmits the payment data 215 to the issuer server as its address. Note that the communication device 213 may transmit the payment data 215 to the issuer server 218 via the acquirer server 216 or the card brand server 217.

Furthermore, the communication device 213 receives credit result data 219 from the issuer server 218 via the card brand server 217 and the acquirer server 216 and transmits the received credit result data 219 to the processing device 212. For example, the issuer server 218 transmits the credit result data 219 to the card payment terminal 200 as its address. Note that the issuer server 218 may transmit the credit result data 219 to the card payment terminal 200 via the acquirer server 216 or the card brand server 217. The processing device 212 determines credit complete or credit unauthorized based on the credit result data 219. The credit result data 219 will be described later with reference to FIG. 11.

The database DB are included in a terminal placed in a member store, for example, and stores data used by the member store in past dealing with the client. The data are stored with a deal ID 220 added thereto in each dealing with the client and include, for example, client ID 221, deal data 222 including item name, price, and the like, sending data 223 including sending address and date of the item, and payment/authentication data 224 including card-related data, payment sum, and the like. The payment/authentication data 224 include card data 225, payment sum 226, and authenticated user (target users for authentication) ID 228 if the biometric authentication is performed.

The card data 225 store data necessary in the member store side from the data included in the card data D acquired by the card data read/write device 210.

Note that, other than the authenticated user ID 228, the payment/authentication data 224 include similar contents with the payment data 215 transmitted form the card terminal 209 to the server 216; however, they may not match. Furthermore, the deal data 222, sending data 223, and payment/authentication data 224 may include data other than the above-described data.

The database DB is connected to the card terminal 209 and transmits/receives data to/from the card terminal 209 via a database interface provided with the processing device 212 of the card terminal 209, for example.

FIG. 8 shows data structure of a first example of the payment data 215 of the present embodiment. The payment data 215a are created when communication is performed between the card terminal 209 and the server 216. The payment data 215a are basically the payment data 215a of FIG. 8; however, based on conditions, the payment data 215a may be payment data 215b of FIG. 9 or payment data 215c of FIG. 10.

The payment data 215a include a card number 201, expiration date 202, name 203, payment sum 226, payment option 229, member store data 230, and may include other data.

The member store data 230 include data specifying the member store such as a name of member store, address, and business category.

FIG. 9 shows data structure of a second example of the payment data 215 of the present embodiment.

If the biometric data 206 of user U are acquired but the biometric data 205 are not included in the card data D, the card terminal 209 creates, in order to perform the biometric authentication in any one of servers 216 to 218, payment data 215b including the payment data 215a and the biometric data 206 and transmits the payment data 215b to the server 216.

If the server 216 or the server 217 receives the payment data 215b, the server 216 or the server 217 determines whether or not the biometric data to be compared with the biometric data 206 are stored therein. If the server 216 or the server 217 stores the biometric data to be compared with the biometric data 206, the server 216 or the server 217 performs comparison using the biometric data 215b included in the payment data 215b and the stored biometric data. If the server 216 or the server 217 does not store the biometric data to be compared with the biometric data 206, the server 216 or the server 217 transmits the payment data 215b to the server 217 or the server 218.

Figure 10:
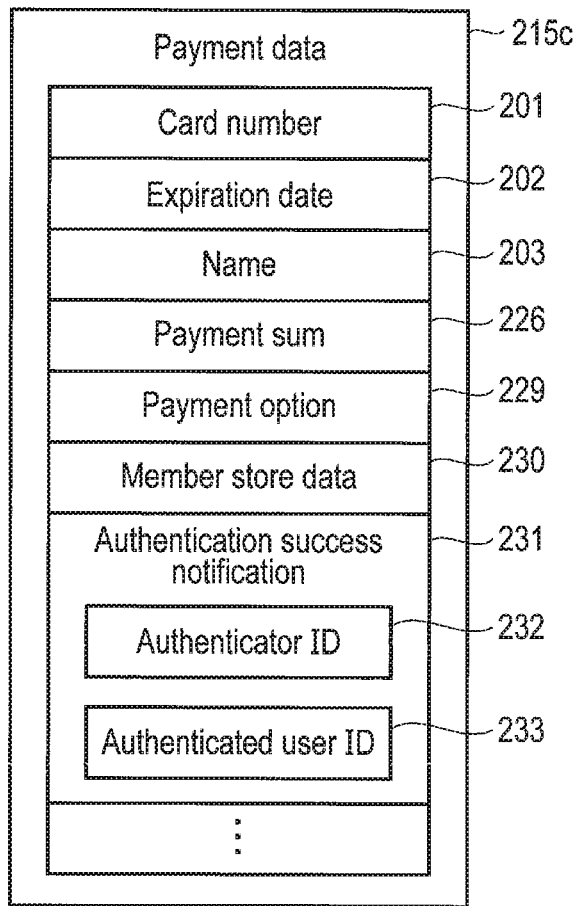
FIG. 10 shows data structure of a third example of the payment data of the second embodiment.

FIG. 10 shows a data structure of a third example of the payment data 215 of the present embodiment.

The card terminal 209, server 216, or server 217 compares the biometric data 205 stored in the card C, biometric data stored in the server 216, or the biometric data stored in the server 21 with the biometric data 206, and if the biometric authentication is a success, creates payment data 215c including authentication success notice 231 as a substitute to the biometric data 206 of the payment data 215b of FIG. 9. Then, the card terminal 209, server 216, or server 217 transmits the payment data 215c to the server 216, server 217, or server 218.

The authentication success notice 231 includes authenticator ID 232 which specifies the performer of the biometric authentication and authenticated user ID 233 which specifies the target of the biometric authentication.

If the biometric authentication succeeds in the processing device 212, the authenticator ID 232 may be, for example, member store ID corresponding to the card payment terminal 200, ID of the card payment terminal 200, or account data of the member store.

If the biometric authentication succeeds in the server 216 or the server 217, the authenticator ID may be, for example, acquirer ID which manages/operates the server 216 or card brand ID which manages/operates the server 217.

The authenticated user ID 233 may be, for example, a unique ID or a name which can specify an authenticated person.

Note that, if the biometric authentication using the biometric data 206 and the biometric data 205 fails in the card payment terminal 200, the payment fails at this point of time, and communication with the server 216, 217, or 218 is unnecessary and the payment data 215 may not be created.

Figure 11:
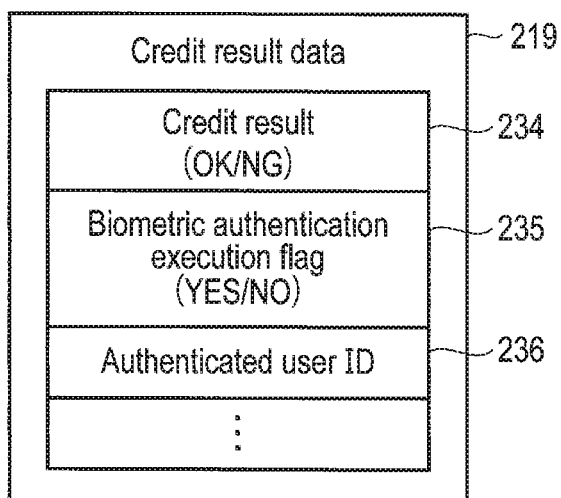
FIG. 11 shows data structure of credit result data of the second embodiment.

FIG. 11 shows an example of credit result data 219 of the present embodiment.

The credit result data 219 include a credit result 234 and a biometric authentication execution flag 235. The credit result data 219 further include an authenticated user ID 236 if the biometric authentication is performed and is a success.

The credit result 234 indicates OK of NG of the credit result and may be represented by a one bit flag, for example.

The biometric authentication execution flag 235 indicates whether or not the biometric authentication is performed and may be represented by a one bit flag.

The authentication user ID 236 indicates to which authenticated user the credit result data 219 corresponds. Furthermore, with the authenticated user ID 236, the credit result data 219 and the payment data 215 can be associated together.

Figure 12:
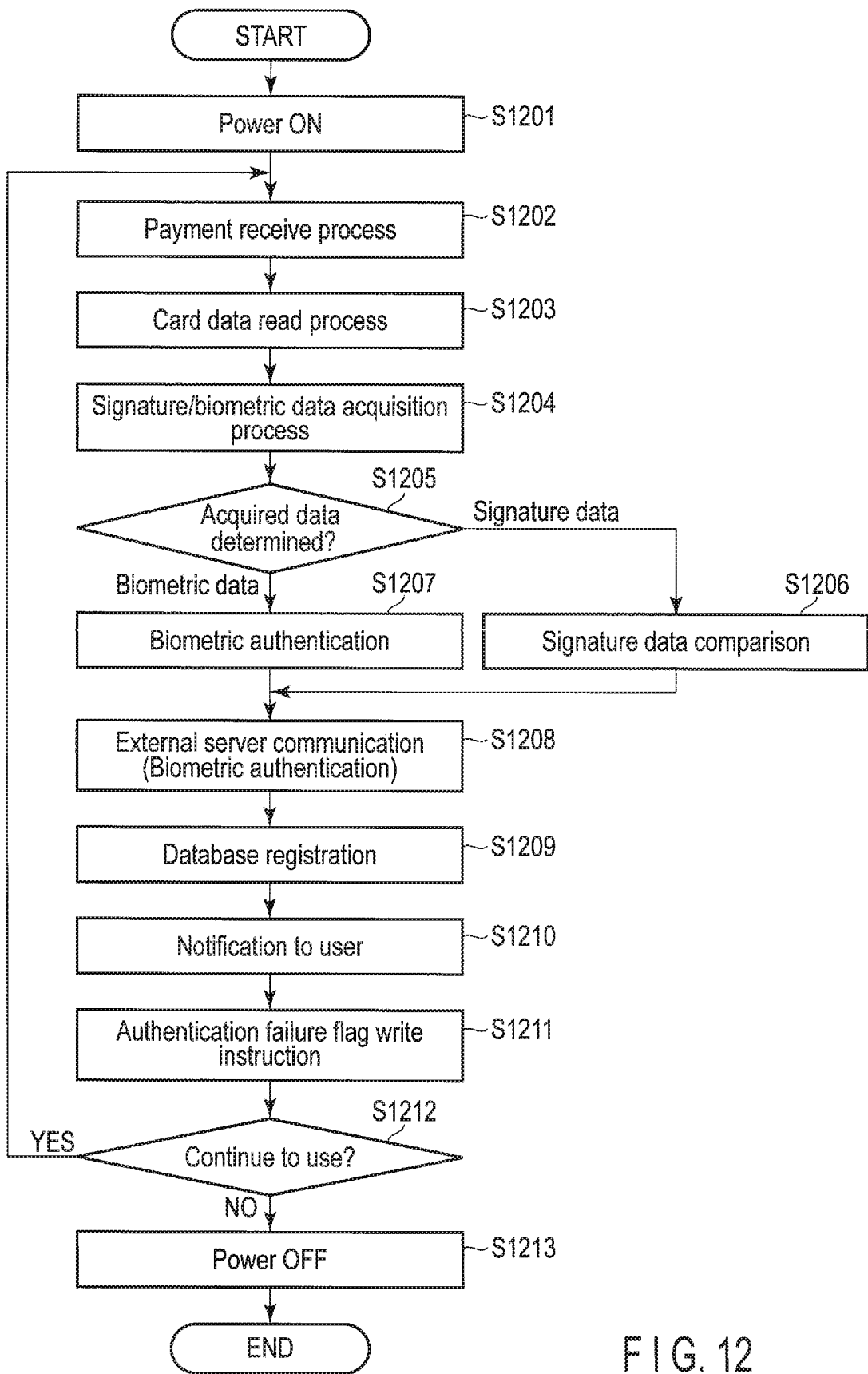
FIG. 12 is a flowchart of an example of a card payment terminal process of the second embodiment.

FIG. 12 is a flowchart of an example of a process of the card payment terminal 200.

In step S1202, the card payment terminal 200 is turned on in a member store and the biometric data acquisition device 208, signature input device 207, and card terminal 209 are set to a stand-by mode.

In step S1202, the card terminal 209 executes a payment receiving process using the payment receiving device 211. For example, in the payment receiving process, payment sum and payment option of item or service are received.

In step S1203, the card terminal 209 uses the card data read/write device 210 to execute a card data read process. For example, in the card data read process, a data storage area for the card data D is initialized, and read of the card data D is performed. If the card data D are read, the card data D are stored in the data storage area for card data D. For example, if read of the card data D fails for certain trials such as three times, an error is displayed.

In step S1204, the card terminal 209 uses the signature input device 207 or the biometric data acquisition device 208 to execute an acquisition process of the signature data 214 or the biometric data 206. For example, a data storage area secured for the signature data 214 or the biometric data 206 is initialized and the acquired data are stored in the data storage area.

In step S1205, the card terminal 209 executes an automatic determination process to determine whether the acquired data are the signature data or the biometric data. The determination process may be performed by recognizing a feature or a pattern of each of the data, for example. For example, if finger print data are used, the acquired data are image data, and a large number of layered lines show on an image as a feature. For example, if finger vein data are used, two dimensional data of time and amplitude are acquired, and the amplitude shows pulses at certain intervals as a feature. Furthermore, if signature data are used, acquired data are image data having a feature represented by linear characters or shapes.

If the acquired data are determined to be signature data in step S1205, the card terminal 209 performs a signature data comparison process in step S1206. The signature data comparison process will be described later with reference to FIG. 13.

If the acquired data are determined to be biometric data in step S1205, the card terminal 209 performs a biometric authentication process in step S1207.

In step S1208, the card terminal 209 creates payment data 215, transmits the payment data 215 to a server 216, and receives credit result data 219 from the server 216. If the payment is determined to be a failure with the credit result data 219, the deal is stopped.

Note that, when the biometric authentication is performed in step S1207, the card terminal 209 checks whether or not the biometric data 205 are included in the acquired card data D.

If the biometric data 205 are not included in the card data D, the biometric authentication cannot be performed in the card terminal 209. In that case, the payment data 215b including the biometric data 206 acquired by the biometric data acquisition device 208 are transmitted to the server 216 in step S1208, and then, the biometric authentication is performed in any of the servers 216 to 218.

If the biometric data 205 are included in the card data D, the card terminal 209 performs the biometric authentication.

If the biometric authentication fails in the card terminal 209, the payment fails at this point of time. Thus, in that case, preparation of the payment data 215, transfer of the payment data 215 to the server 216, and reception of the credit result data 219 from the server 216 may not be performed in step S1208.

If the biometric data 205 of several persons are stored in the card data D, the card terminal 209, or any of the servers 216 to 218 performs sequential comparison with respect to the biometric data of the comparison candidates in the biometric data of several persons until the comparison of the biometric data 206 acquired by the biometric data acquisition device 208 is finished, or the comparison of all biometric data of several persons is performed. When the comparison is complete, the card terminal 209 or any of the servers 216 to 218 obtains comparison authenticated user ID.

In step S1209, the card terminal 209 registers the deal ID 220, deal data 222, sending data 223, and payment/authentication data 224 in the database DB.

If the biometric authentication is performed in step S1207 or S1208, the card terminal 209 stores authenticated user ID in the database DB via the processing device 212 if the biometric authentication is performed in the card terminal 209 or in any of the servers 216 to 218.

Note that, the processing device 212 can determine a biometric authentication result in any of the servers 216 to 218 based on the credit result data 219. The processing device 212 determines whether or not the biometric authentication has been performed based on the biometric authentication execution flag 235 included in the credit result data 219. The processing device 212 confirms a presence of the authenticated user ID if the biometric authentication has been performed. If the authenticated user ID is not present, the biometric authentication is determined to be a failure, and if the authenticated user ID is present, the biometric authentication is determined to be a success.

If the biometric authentication or the signature data comparison fails in step S1210, the card terminal 209 notifies the failure. For example, the card terminal 209 may display or announce a biometric authentication failure or a signature data comparison failure with a display or a speaker of the card payment terminal 200.

Furthermore, the card terminal 209 may notify to user U with communication means. For example, a mail address of user U may preliminarily be registered in the database DB, and the processing device 212 refers the mail address in database DB and sends mail to user U through the communication device 213.

If the biometric authentication is performed in any of the servers 216 to 218 and the biometric authentication fails, the notification to user U may be performed by a server in which the biometric authentication fails.

Furthermore, the card terminal 209 may display or announce a success if the biometric authentication or the signature data comparison succeeds.

In step S1211, if the card terminal 209 determines a failure of the biometric authentication, the card terminal 209 transmits a write instruction of the authentication failure flag 204 with respect to the card data read/write device 210 using the processing device 212. The card data read/write device 210 writes the authentication failure flag 204 with respect to the card C.

If the biometric authentication fails, there is a high possibility that a third person uses the card wrongfully. Thus, in the present embodiment, the card C in which the authentication failure flag 204 is written is determined to be unusable when being read by the card terminal 209 in the next use, and thus, the card terminal 209 can increase the security of card.

In step S1212, the card terminal 209 returns to step S1202 if the use continues. If the use stops, the card payment terminal 200 is turned off in step S1213.

Figure 13:
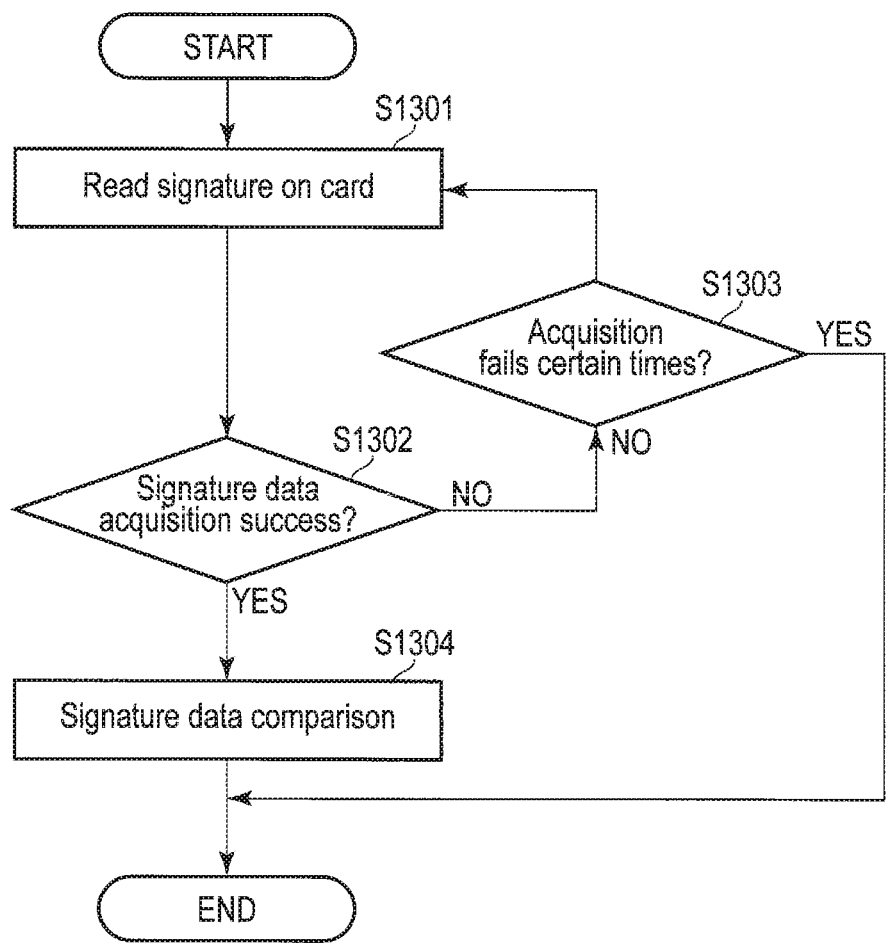
FIG. 13 is a flowchart of an example of a signature data matching process of the second embodiment.

FIG. 13 is a flowchart of an example of the signature data comparison process.

In step S1301, the signature input device 207 reads a signature D3 of card C, and if the read succeeds, the signature D3 is kept as signature data 227 on the card C.

If the read of the signature D3 fails (step S1302), the process returns to step S1301, and the signature input device 207 again reads the signature data 227 of card C. If the read of signature D3 fails more than a certain number (step S1303), the comparison of signature data is determined to be a failure, and the process may be finished. A failure or a success of the read of signature D3 may be determined by the following criterion. For example, a signature area A on card C is automatically recognized by an imaging process and whether or not the signature area A is properly acquired is determined. Note that determination of a failure or a success of the read of signature data 227 on card C may be performed by the processing device 212.

In step S1302, if the read of signature data 227 on card C succeeds, the processing device 212 compares the signature data 227 on card C and signature data 214 input by user U (step S1304).

If the signature data 227 on card C and the signature data 214 input by user U are determined to be similar and the comparison succeeds, the authentication is determined to be done and the comparison process ends. If the signature data 227 on card C and the signature data 214 input by user U are determined to be dissimilar, or if the signature data 227 on card C are not acquired in step S1302, the comparison is determined to be a failure, and the failure is notified to the user in step S1210.

Note that the comparison process of the signature data is, preferably, automatically performed by an image matching technique such as pattern matching; however, it may be performed by other methods such as a viewing verification by a store clerk operating the card payment terminal 200.

In a card storing the biometric data of several users, that is, in a card which can be shared with several users, the signature data change every time when a signature is input. Thus, only a certain user of the several users may be allowed to perform a signature input. Furthermore, in a card which can be shared with several users, a signature input may be set unusable. For example, in a card shared with several users, if the acquired data are determined to be signature data in step S1205 of FIG. 12, the deal may be stopped, invalid deal may be notified to a store clerk operating the card payment terminal 200, and a notification or warning may be performed to user U.

Note that, if the signature data can be stored in a card as with the biometric data, the authentication can be performed with the signature data input as in the biometric data authentication which will be described later, and the signature comparison can be applied to a card which is shared with several users.

In the present embodiment, the card payment terminal 200 is described as a terminal provide with a member store of card payment service as an example; however, the card payment terminal 200 may be a different device which can acquire the biometric data 206 of user 206, signature data 214 of user U, and card data D of card C. For example, the card payment terminal 200 may be an information processing device including a biometric data acquisition function, card data read function, payment reception function, biometric authentication function, and communication function. Each function of the information processing device may be realized by software, hardware, or cooperation of software and hardware. Hardware required to realize each function of the information processing device may be installed in the information processing device or may be externally added to the information processing device. Items and services of the present embodiment may be bought in a store or may be bought in an electronic commerce website or a service provider website on network. The information processing device may be, for example, a mobile phone, personal computer, or tablet computer.

In the present embodiment, data stored in the database DB are data of each client; however, the stored data may be data of each deal. In that case, storage of data specifying a client such as name of client or client ID is necessary in each deal.

In the present embodiment, data acquired from user U in the card payment time are signature data or biometric data, and in addition thereto, passcode input which is a general authentication method of card payment may be selected.

In the flowcharts of FIGS. 12 and 13, the order of steps may be arbitrarily changed as long as the change does not affect the process result.

In the present embodiment, the payment data 215, and 215a to 215c may be separated.

Hereinafter, specific effects of the present embodiment will be explained.

In the present embodiment, the card payment terminal 200 corresponds to a plurality of card authentication methods. For example, data acquired by user U are automatically determined to be signature data or biometric data. Thus, a clerk of a member store operating a payment terminal 209 does not consider the kinds of acquired data and can automatically proceed the card payment process, and thus, convenience of user of card payment can be increased.

Furthermore, as in the first embodiment, one card may be shared by several users. In the present embodiment, if the biometric authentication is performed by the card terminal 209 or any of the servers 216 to 218 and a plurality of biometric data 205 are included in the card data D, biometric data are sequentially checked until the comparison with the acquired data finishes. When the comparison finishes, the comparison result is stored in the database DB. Thus, even if a card is shared with several users, a person who uses the card can be specified. Furthermore, if the authentication fails, notification is sent to the user, and the card is set unusable by writing authentication failure data to the card, and an unauthorized use of card payment can be prevented.

Furthermore, if the card C is used wrongfully by a third person, the authentication will not succeed for a third person with biometric authentication while the authentication may succeed for a third person with a passcode input or a signature input. Furthermore, because of a fraud or the like, the card may possibly be used unintentionally. In the present embodiment, if the card payment terminal 200 acquires signature data 214 from user U, the card payment terminal 200 checks whether or not the signature data 214 and the signature data 227 on card C are similar to determine the validity of acquired signature data 214. Furthermore, if the check fails, the failure is notified to user U to notify an unauthenticated use of card C. Thus, even if the authentication is performed with a signature, security of card C can be increased.

In the present embodiment, if the card payment terminal 200 checks the signature data, the signature input device 207 reads the signature data 227 on card C. However, the card data read/write device 210 has a function to read the signature data 227 on card C, the card data read/write device 210 may read the signature data 227 on card C.

In the present embodiment, data related to the card payment are stored in the database DB. Thus, the store does not require to manage card payment document which is a paper medium for a long period of time, and management cost and power of the store can be decreased significantly.

Third Embodiment

In the third embodiment, a card payment system is structured with the card payment terminal 200 and the server 218 of the second embodiment. This card payment system provides a security service which can prevent possible unintentional use of card payment for users such as elderly, handicapped, and minors.

The third embodiment can be applied to a case where the multifunction card 1 of the first embodiment is used.

Now, the embodiment of the card payment system of the third embodiment will be explained with reference to the accompanying drawings.

FIG. 14 is a block diagram showing an example of structure of a card payment system of the present embodiment. In the present embodiment, in addition to the card payment terminal 200 and the server 218 of the second embodiment, an operator 301 and a database 302 connected to the server 218 structure a card payment system 300. The server 218 is the issuer server 218 in the following description; however, it may be the acquirer server 216 or the card brand server 217.

For the communication between the card payment terminal 200 and the server 218, the payment data 215 and the credit result data 219 are used, and operation and structure thereof are as described in the second embodiment.

The server 218 can read/write data from/to the database 302.

The database 302 stores personal data 302a of user U necessary for the card payment, erroneous pattern data indicative of a past erroneous payment data pattern, and optional data included in the payment data 215 used for the past card payment of user U.

The operator 301 is an interface used when user U sets the personal data 302a with respect to the database 302, and the operator 301 may be a telephone operator in the issuer side which substitutes setting or a special registration form for user U provided with the issuer server 218.

Note that the operator 301 may be included in the server 218, or if the user U can directly access to the database 302, the operator 301 may be omitted.

FIG. 15 is a flowchart of an example of a setting process of personal data 302a of the present embodiment.

The user U preliminarily registers personal data 302a such as maximum amount of card payment and payment region (card use condition data) in the database 302 such that the server 218 can determine whether or not the card payment is intended by user U using the personal data 302a when the card payment is performed.

The user U asks the operator 301 to set the personal data 302a of card payment such as use limit, maximum amount, and payment region (step S1501). The payment region is set to prevent a card use outside the living area. For example, companies which are related to wrongful charge and consumer fraud (hereinafter referred to as frauds) tend to reside in a particular region. Thus, monitoring the payment region is effective for preventing frauds.

Note that the user U may ask the operator 301 to set additional personal data 302a if necessary.

When receiving the setting request of personal data 302a from the user U, the operator 301 transmits a setting command of user data to the server 218 (step S1502).

When receiving the setting command of user data from the operator 301, the server 218 sets user data in the database 302 (step S1503).

Figure 16:
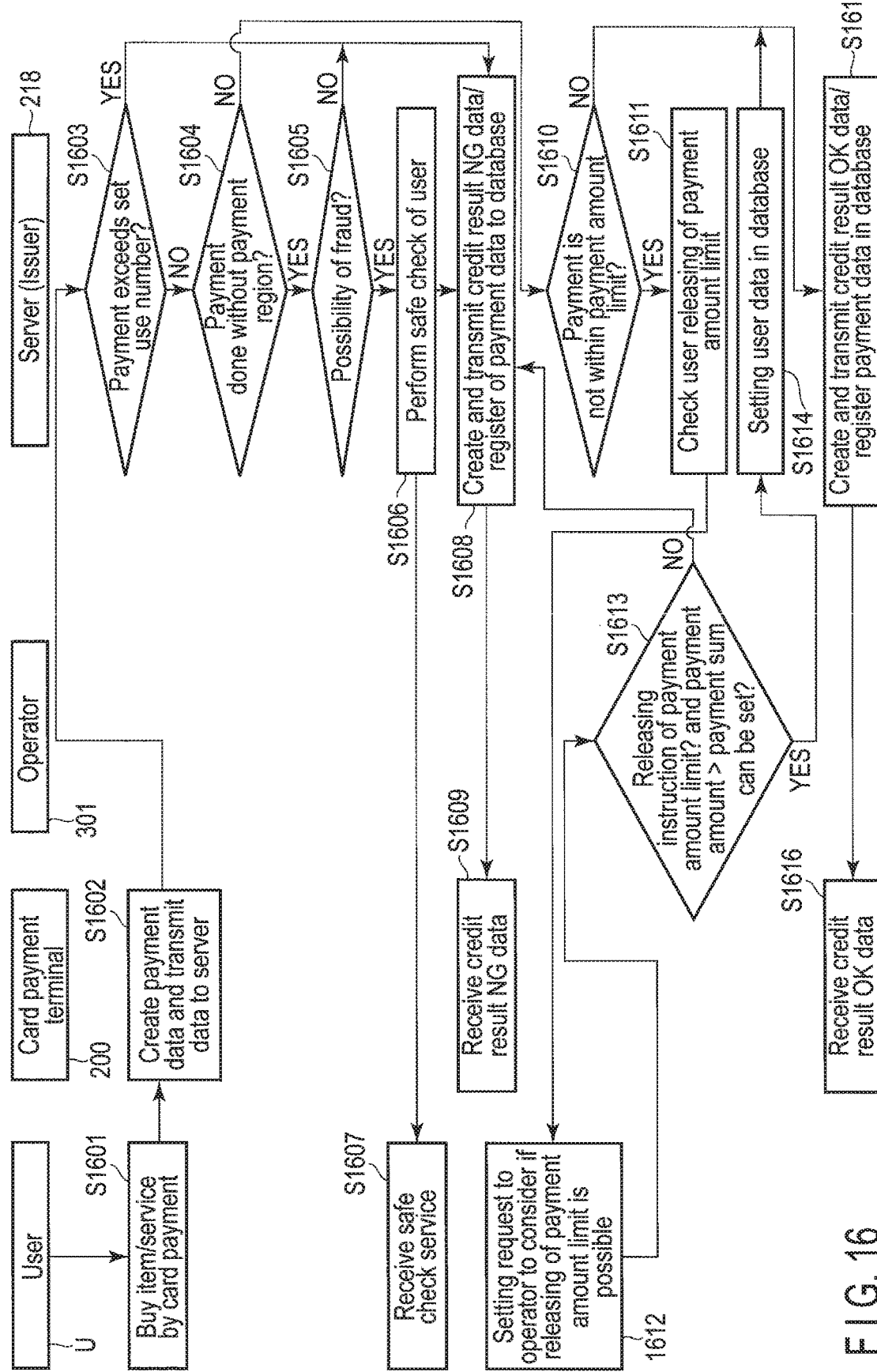
FIG. 16 is a flowchart of an example of a security service process of the third embodiment.

FIG. 16 is a flowchart of a security service process of the present embodiment. Note that the personal data 302a of user U are set in the database 302 in the process of FIG. 15.

When the user U buys an item or service through the card payment using the card payment terminal 200 provided with a member store (step S1601), the card payment terminal 200 creates the payment data 215 and transmits the payment data 215 to the server 218 (step S1602).

The server 218 refers to the use number of the personal data 302a of user U set in the database 302 and compares the use number with an actual use number of user U obtained by retrieval in the database 302 (step S1603). When the use number of user U exceeds the use number set, the server 218 determines that the card is unusable, that is, the credit result is NG, and moves to step S1608. Otherwise, the server 218 moves to step S1604.

The server 218 refers to the payment region of the personal data 302a of user U set in the database 302 and compares the payment region with an address of the member store data 230 included in the payment data 215 (step S1604).

If the address of member store data 230 is not included in the payment area set in the database 302, the server 218 determines whether or not there is a possibility of frauds (step S1605). For example, if the database 302 stores the payment data of past frauds, the server 218 reads the payment data of past frauds as error pattern data 302b and compares the member store data 230 of payment data 215 and payment sum 226 to determine whether or not there is a possibility of frauds. Furthermore, the server 218 may compare the payment sum 226 with the maximum amount set in the database 302 by user U and determines there is a possibility of frauds if the payment sum 226 is higher than a certain amount.

In step S1605, if there is not a possibility of frauds, the process moves to step S1608. If there is a possibility of frauds, the server 218 performs a safe check of user (step S1606). The user U receives safe check service (step S1607). The safe check may be notified to a contact preliminarily set by the user in the database 302 by automatic voice guidance, or by automatic mailing service, or by other means. Furthermore, if the safe check cannot be performed through, the server 218 may notify an unsafe state to, for example, emergency contact of user U, adult guardian, police, and/or security company stored in the database 302 via automatic voice guidance, automatic mailing service, or other means.

In step S1608, the server 218 creates credit result data 7 which set the credit result NG and transmits the data 7 to the card payment terminal 200. Furthermore, if a possibility of frauds is detected in step S1605, data related to the deal in the payment data 215, that is, payment sum 226, member store data 230, and additional necessary data are stored in the database 302. The card payment terminal 200 receives the credit result NG data and the payment fails (step S1609).

In step S1604, if the server 218 determines that the address of member store data 230 is within the payment region set in the database 302, the server 218 compares the payment sum in a certain period of time of use U stored in the database 302 including the current payment sum 226 of user U in the payment data 215 with the maximum amount set by the user U in the database 302 (step S1610). If the sum is within the maximum amount, the credit result is determined OK and the process moves to step S1615. If the sum is not within the maximum amount, the server 218 confirms releasing of the maximum amount limit to the user U (step S1611).

If the user U receives releasing of the maximum amount limit, the user U asks the operator 301 to set releasing or not releasing the maximum amount limit (step S1612).

In step S1613, if the operator 301 receives a setting request of releasing the maximum amount limit by user U and the maximum amount of user U can be set to exceed the payment sum 226, the operator 301 instructs the server 218 to release the maximum amount limit of user U. If the operator 301 does not receive a setting request of releasing the maximum amount limit or the maximum amount of user U cannot be set to exceed the payment sum 226, the operator 301 sets the credit result to NG and instructs the server 218 to step S1608.

If the server 218 receives releasing of the maximum amount limit from the operator 301, the server 218 sets the maximum amount of user U to the amount which can be set and exceeds the payment sum 226 (step S1614).

In step S1615, the server 218 creates the credit result data 219 of credit result as OK and sends the data 219 to the card payment terminal 200. Furthermore, the data specifying that the deal is made by user U and the payment sum of the payment data 215, that is, card number 201, name 203, payment sum 226, payment option, and additional necessary data are stored in the database 302. The card payment terminal 200 receives the credit result OK data and the payment succeeds (step S1616).

In the present embodiment, the personal data 302a such as use number, payable limitation, and payment region are set in the database 302, and credit is permitted by comparing the personal data 302a and past card payment data stored in the database 302 with the current payment data 215. Thus, unintentional use of the card and frauds using the card can be prevented.

In the present embodiment, the use number of the card of each user may be set monthly or daily. Furthermore, conventionally, the maximum amount of credit cards is set as a whole, and the maximum amount of debit cards and cash cards is set as a balance of the bank account; however, in the present embodiment, the maximum amount can be set finely depending on uses of the card. For example, with fine setting, the cash withdrawal can be performed once in a day by twenty thousand yen, cash deposition can be performed twice in a day by thirty thousand yen, and ordinary shopping can be performed three times in a day by ten thousand yen.

In the present embodiment, the personal data 302a of user U such as use number, payable limit, and payment region set in the database 302 may be automatically set by the server 218 based on pattering of the card use contents of user U by the server 218 or of scoring of the use number, use interval, use store, use purpose, credit balance of user U by the server 218.

In the flowchart of FIG. 16, the order of steps may be arbitrarily changed as long as the comparison between the personal data 302a stored in the database 302 in the server 218 or the past card payment data and the current payment data 215 can be performed, for example. Or, a plurality of steps may be performed by one process module.

In the present embodiment, if the payment exceeds the maximum amount preliminarily set by user U, the server confirms releasing of the maximum amount limit. Thus, releasing of maximum amount by a third person which is not user U can be prevented and unintentional high card payment can be prevented.

Furthermore, in the present embodiment, if there is a possibility of frauds, safe check of user is performed to strongly protect users U including elderly, handicapped, and minors.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A multifunction card comprising an integrated circuit including a non-transitory memory, a processor, and a communicator, wherein the non-transitory memory stores first software executed by the processor to realize a card payment function, second software executed by the processor to realize an other function than the card payment function, biometric data for a user using the card payment function, and setting data indicative of a necessity of biometric authentication with respect to the first software and indicative of whether or not the biometric authentication is necessary with respect to the second software, and the processor receives a command from an external device via the communicator, and if the command corresponds to the first software, the processor determines that the biometric authentication is necessary with respect to the first software based on the setting data, reads the biometric data from the non-transitory memory, transmits the biometric data to the external device via the communicator, receives a first biometric authentication result with respect to the biometric data from the external device via the communicator, and transmits first data of card payment corresponding to the first software to the external device via the communicator if the first biometric authentication result indicates success, and if the command corresponds to the second software, the processor determines whether or not the biometric authentication is necessary with respect to the second software based on the setting data, transmits second data with respect to the second software to the external device via the communicator if the biometric authentication is unnecessary, reads the biometric data from the non-transitory memory and transmits the biometric data to the external device via the communicator if the biometric authentication is necessary, receives a second biometric authentication result with respect to the biometric data from the external device via the communicator, and transmits the second data with respect to the second software to the external device via the communicator if the second biometric authentication result indicates success, and wherein the processor stores history data in a non-transitory memory, and the history data includes data associating the first biometric authentication result, first software identification data indicative of the first software, and first time data corresponding to the first biometric authentication result together if the first biometric authentication result is received, or includes data associating the second biometric authentication result, second software identification data indicative of the second software, and second time data corresponding to the second biometric authentication result together if the second biometric authentication result is received.

2. The multifunction card of claim 1, wherein the biometric data includes a plurality of biometric data corresponding to a plurality of users, the setting data indicates a grant of use of the second software if the second biometric authentication result indicates success with respect to the users, and the processor sequentially reads the plurality of the biometric data corresponding to the users granted to use the second software based on the setting data if the command corresponds to the second software, transmits the read biometric data to the external device via the communicator, receives the second biometric authentication result with respect to the read biometric data from the external device via the communicator, and transmits the second data with respect to the second software to the external device via the communicator if the second biometric authentication result indicates success.

3. The multifunction card of claim 1, wherein the processor receives third software and data indicative of whether or not the biometric authentication is necessary with respect to the third software from an external information processing device via the communicator, stores the third software in the non-transitory memory, and adds the data to the setting data.

4. A card payment terminal which can communicate with the multifunction card of claim 1, the terminal comprising:
a card communicator which communicates with the multifunction card storing first biometric data;
a biometric data acquirer which acquires second biometric data of a user of the multifunction card;
a payment receiver which receives a payment sum of card payment; and a processor which transmits a payment command to the multifunction card via the card communicator, receives the first biometric data from the multifunction card via the communicator, creates a biometric authentication result based on a check of the first biometric data and the second biometric data, transmits the biometric authentication result to the multifunction card via the communicator, receives at least one of user identification data indicative of the user of the multifunction card and the card identification data indicative of the multifunction card via the card communicator if the biometric authentication result indicates success, and stores the payment sum and the received data in a database.

5. The card payment terminal of claim 4, wherein the terminal is a mobile phone.

6. A card payment system comprising the card payment terminal of claim 4 and a server which can communicate with the card payment terminal, wherein the server preliminarily stores card use condition data with respect to the user which are set based on at least one of a card use maximum amount, card use number, and card payment region, and the server determines, based on the card use condition data and payment data transmitted from the card payment terminal, whether or not the payment data satisfies the card use condition data and allows payment if the payment data satisfies the card use condition data.

7. The card payment system of claim 6, wherein the server compares the card use maximum amount of the user and payment sum included in the payment data, and based on a result of the comparison, executes a process to inquire whether or not the maximum amount with respect to the user is released if the payment sum exceeds the card use maximum amount.

8. The card payment system of claim 6, wherein the server monitors the payment data of the user, and detects an error by comparing the payment data and error pattern data indicative of an error pattern of past payment data.

9. A multifunction card comprising an integrated circuit including a non-transitory memory, a processor, and a communicator, wherein the non-transitory memory stores first software executed by the processor to realize a card payment function, second software executed by the processor to realize an other function than the card payment function, biometric data for a user using the card payment function, and setting data indicative of a necessity of biometric authentication with respect to the first software and indicative of whether or not the biometric authentication is necessary with respect to the second software, and the processor receives a command from an external device via the communicator, and if the command corresponds to the first software, the processor determines that the biometric authentication is necessary with respect to the first software based on the setting data, reads the biometric data from the non-transitory memory, transmits the biometric data to the external device via the communicator, receives a first biometric authentication result with respect to the biometric data from the external device via the communicator, and transmits first data of card payment corresponding to the first software to the external device via the communicator if the first biometric authentication result indicates success, and if the command corresponds to the second software, the processor determines whether or not the biometric authentication is necessary with respect to the second software based on the setting data, transmits second data with respect to the second software to the external device via the communicator if the biometric authentication is unnecessary, reads the biometric data from the non-transitory memory and transmits the biometric data to the external device via the communicator if the biometric authentication is necessary, receives a second biometric authentication result with respect to the biometric data from the external device via the communicator, and transmits the second data with respect to the second software to the external device via the communicator if the second biometric authentication result indicates success, and wherein the biometric data includes a plurality of biometric data corresponding to a plurality of users, the setting data indicates a grant of use of the second software if the second biometric authentication result indicates success with respect to the users, and the processor sequentially reads the plurality of the biometric data corresponding to the users granted to use the second software based on the setting data if the command corresponds to the second software, transmits the read biometric data to the external device via the communicator, receives the second biometric authentication result with respect to the read biometric data from the external device via the communicator, and transmits the second data with respect to the second software to the external device via the communicator if the second biometric authentication result indicates success.

10. A card payment terminal which can communicate with the multifunction card of claim 9, the terminal comprising:
a card communicator which communicates with the multifunction card storing first biometric data;
a biometric data acquirer which acquires second biometric data of the user of the multifunction card;
a payment receiver which receives a payment sum of card payment; and a processor which transmits a payment command to the multifunction card via the card communicator, receives the first biometric data from the multifunction card via the communicator, creates a biometric authentication result based on a check of the first biometric data and the second biometric data, transmits the biometric authentication result to the multifunction card via the communicator, receives at least one of user identification data indicative of the user of the multifunction card and the card identification data indicative of the multifunction card via the card communicator if the biometric authentication result indicates success, and stores the payment sum and the received data in a database.

11. The card payment terminal of claim 10, wherein the terminal is a mobile phone.

\* \* \* \* \*